United States Patent
Teague et al.

(10) Patent No.: US 11,552,395 B2
(45) Date of Patent: Jan. 10, 2023

(54) ESA QUADRANT MECHANICAL RECONFIGURATION

(71) Applicant: Rockwell Collins, Inc., Cedar Rapids, IA (US)

(72) Inventors: Jacob G. Teague, West Melbourne, FL (US); James B. West, Cedar Rapids, IA (US); Eric A. Casto, Rockledge, FL (US); Richard Elliott, Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 68 days.

(21) Appl. No.: 17/100,378

(22) Filed: Nov. 20, 2020

(65) Prior Publication Data
US 2022/0166136 A1    May 26, 2022

(51) Int. Cl.
| | |
|---|---|
| *H01Q 3/06* | (2006.01) |
| *G01S 13/66* | (2006.01) |
| *H01Q 1/28* | (2006.01) |
| *H01Q 3/12* | (2006.01) |
| *H01Q 3/26* | (2006.01) |

(Continued)

(52) U.S. Cl.
CPC .......... *H01Q 3/06* (2013.01); *G01S 7/4026* (2013.01); *G01S 13/66* (2013.01); *H01Q 1/281* (2013.01); *H01Q 1/282* (2013.01); *H01Q 3/12* (2013.01); *H01Q 3/26* (2013.01); *H01Q 3/2664* (2013.01);

(Continued)

(58) Field of Classification Search
CPC .......... H01Q 3/06; H01Q 1/281; H01Q 1/282; H01Q 3/12; H01Q 3/26; H01Q 3/2664; G01S 7/4026; G01S 13/66; G01S 2013/0245; G01S 2013/0254
See application file for complete search history.

(56) References Cited

U.S. PATENT DOCUMENTS

| | | | |
|---|---|---|---|
| 6,151,496 | A | 11/2000 | Richards et al. |
| 6,169,522 | B1 | 1/2001 | Ma et al. |

(Continued)

FOREIGN PATENT DOCUMENTS

| | | |
|---|---|---|
| EP | 2359437 B1 | 10/2013 |
| EP | 3621155 A1 | 3/2020 |

OTHER PUBLICATIONS

Extended Search Report in European Application No. 21209612.7 dated Apr. 20, 2022, 8 pages.

(Continued)

*Primary Examiner* — Andrea Lindgren Baltzell
*Assistant Examiner* — Yonchan J Kim
(74) *Attorney, Agent, or Firm* — Suiter Swantz pc llo

(57) ABSTRACT

A system and method for ESA quadrant mechanical reconfiguration functions to shift some of the complexity from algorithmic manipulation of received radar data to mechanical transformation of a simple panel structure to achieve desired performance in a desired ESA boresight. The system receives a rotation trigger based on an external event such as altitude and mission and causes two or more simple ESA panels to rotate from a first azimuthal position to a second common azimuthal position without stopping at an intermediate azimuth. Once positioned, each individual rotational ESA panel is combined to function as a single aggregate ESA enabling desired performance in field of view, resolution, and range along a common boresight.

11 Claims, 11 Drawing Sheets

(51) Int. Cl.
*G01S 7/40* (2006.01)
*G01S 13/02* (2006.01)

(52) U.S. Cl.
CPC ............... *G01S 2013/0245* (2013.01); *G01S 2013/0254* (2013.01)

(56) References Cited

U.S. PATENT DOCUMENTS

| | | | |
|---|---|---|---|
| 6,212,471 B1* | 4/2001 | Stiles | G01S 13/88 342/158 |
| 7,474,263 B1 | 1/2009 | Garfinkle et al. | |
| 10,483,651 B2 | 11/2019 | Huchard et al. | |
| 10,754,020 B2 | 8/2020 | Holt et al. | |
| 2012/0249366 A1 | 10/2012 | Pozgay et al. | |
| 2013/0214972 A1* | 8/2013 | Woodell | H01Q 3/24 342/372 |
| 2017/0029107 A1* | 2/2017 | Emami | G01S 13/003 |
| 2019/0064338 A1* | 2/2019 | Holt | H01Q 1/525 |

OTHER PUBLICATIONS https://coloradoengineering.com/standard-products/skyline/, "Skyline—Active Electronically Scanned Array Radar System", CEI Colorado Engineering Inc., Printed Sep. 9, 2020, 7 pages.
Valpolini, Paolo, https://www.edrmagazine.eu/rada-increases-its-radars-capabilities, "Rada increases its radars capabilities", Rada Electronic Industries, Jun. 19, 2018.

\* cited by examiner

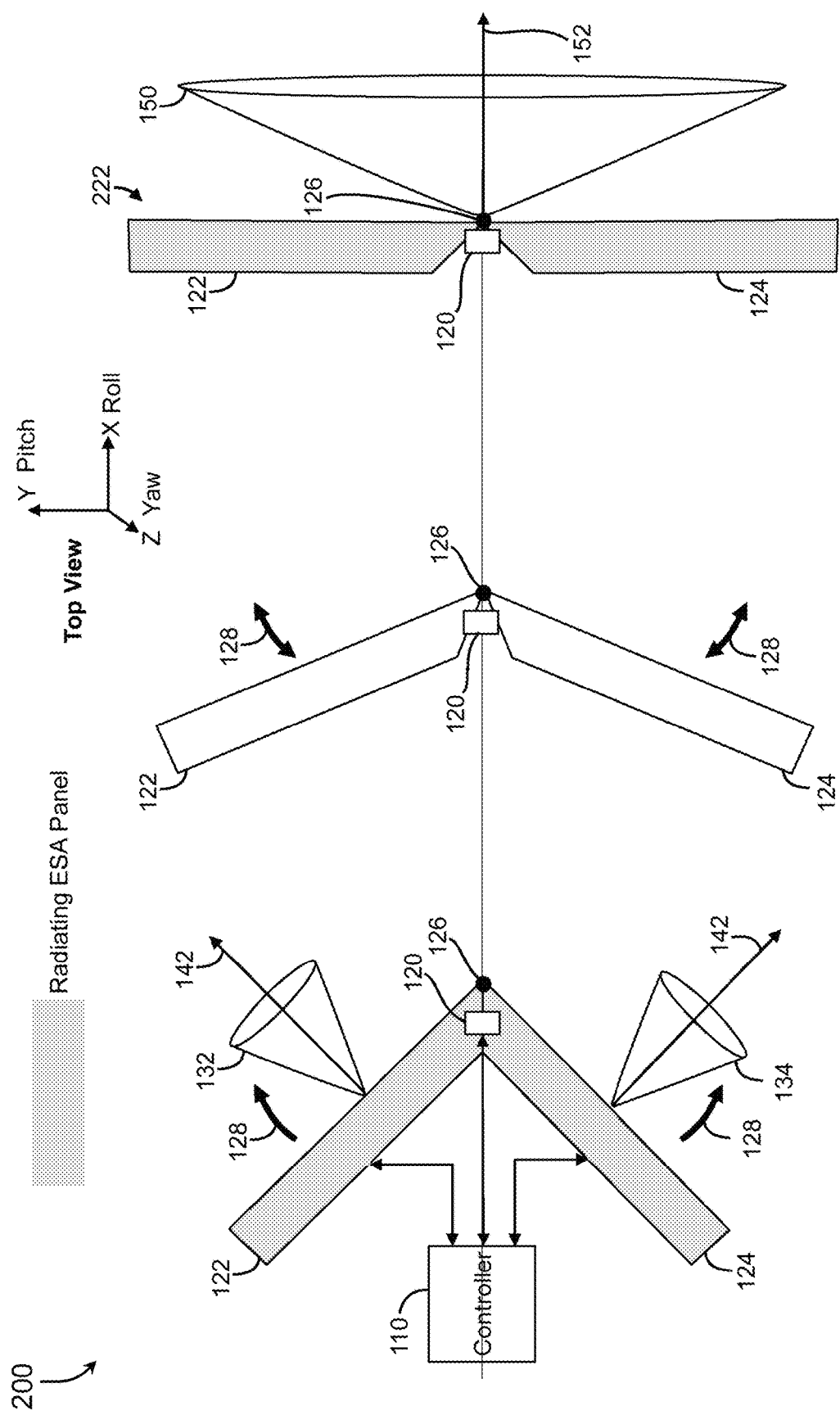

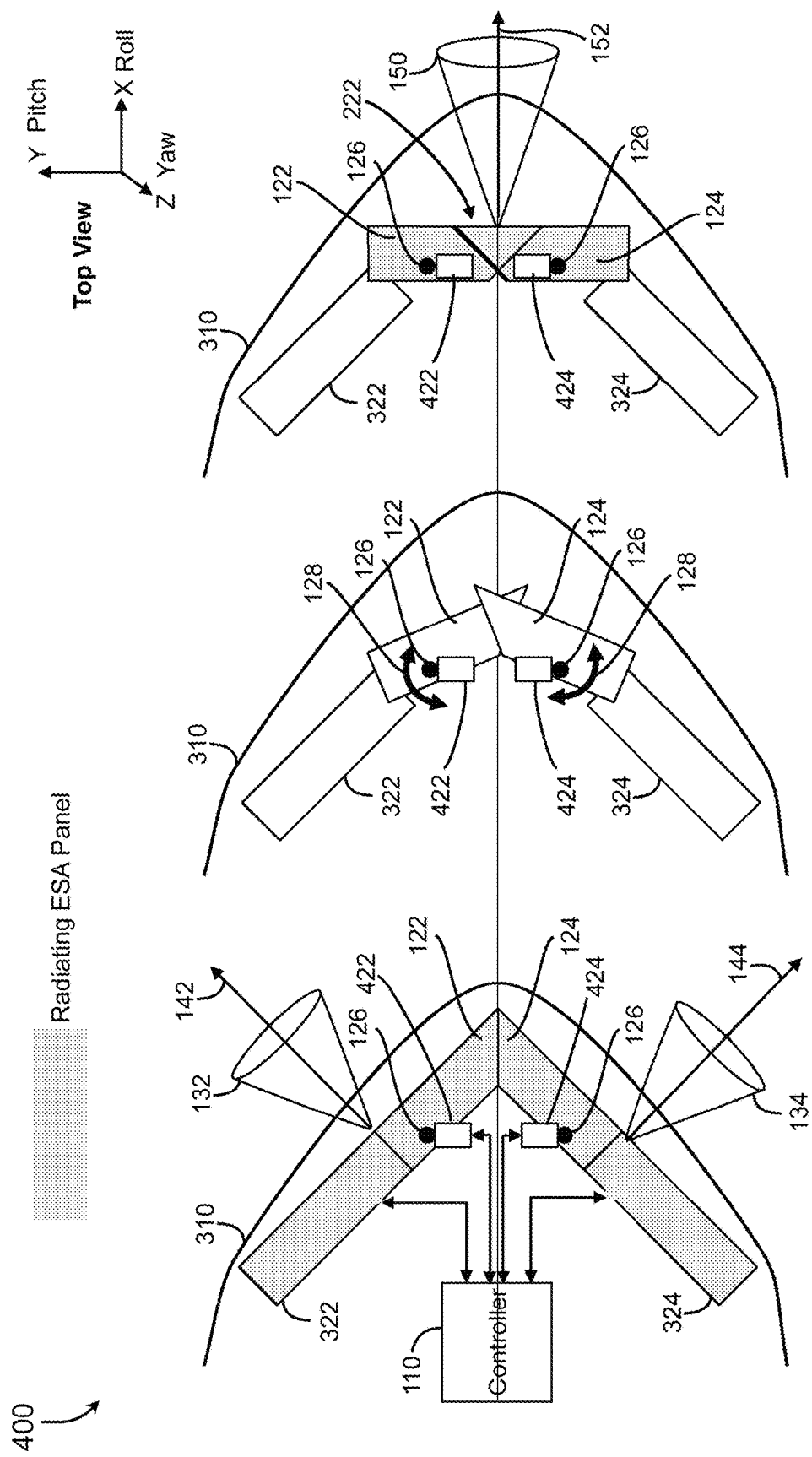

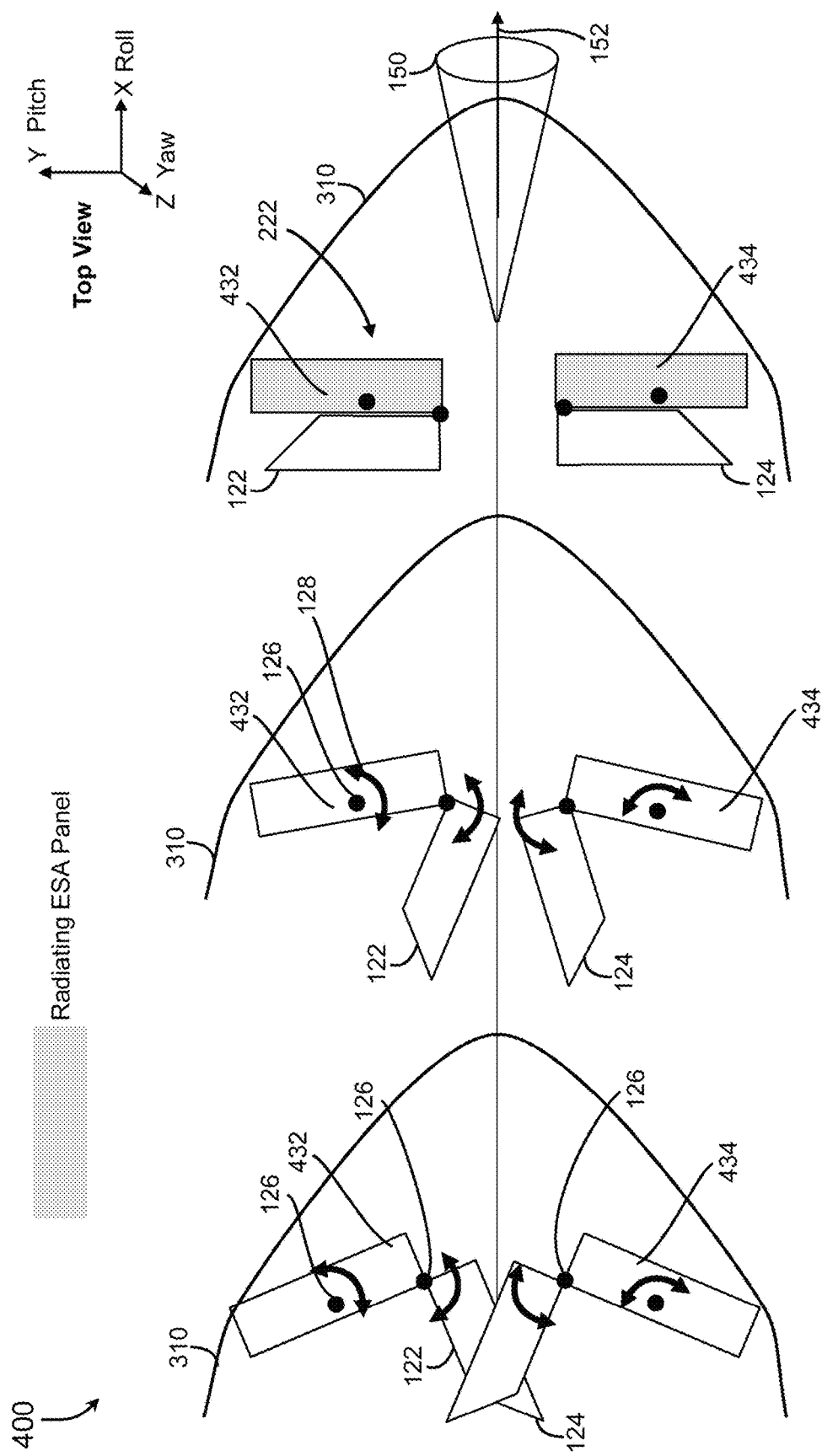

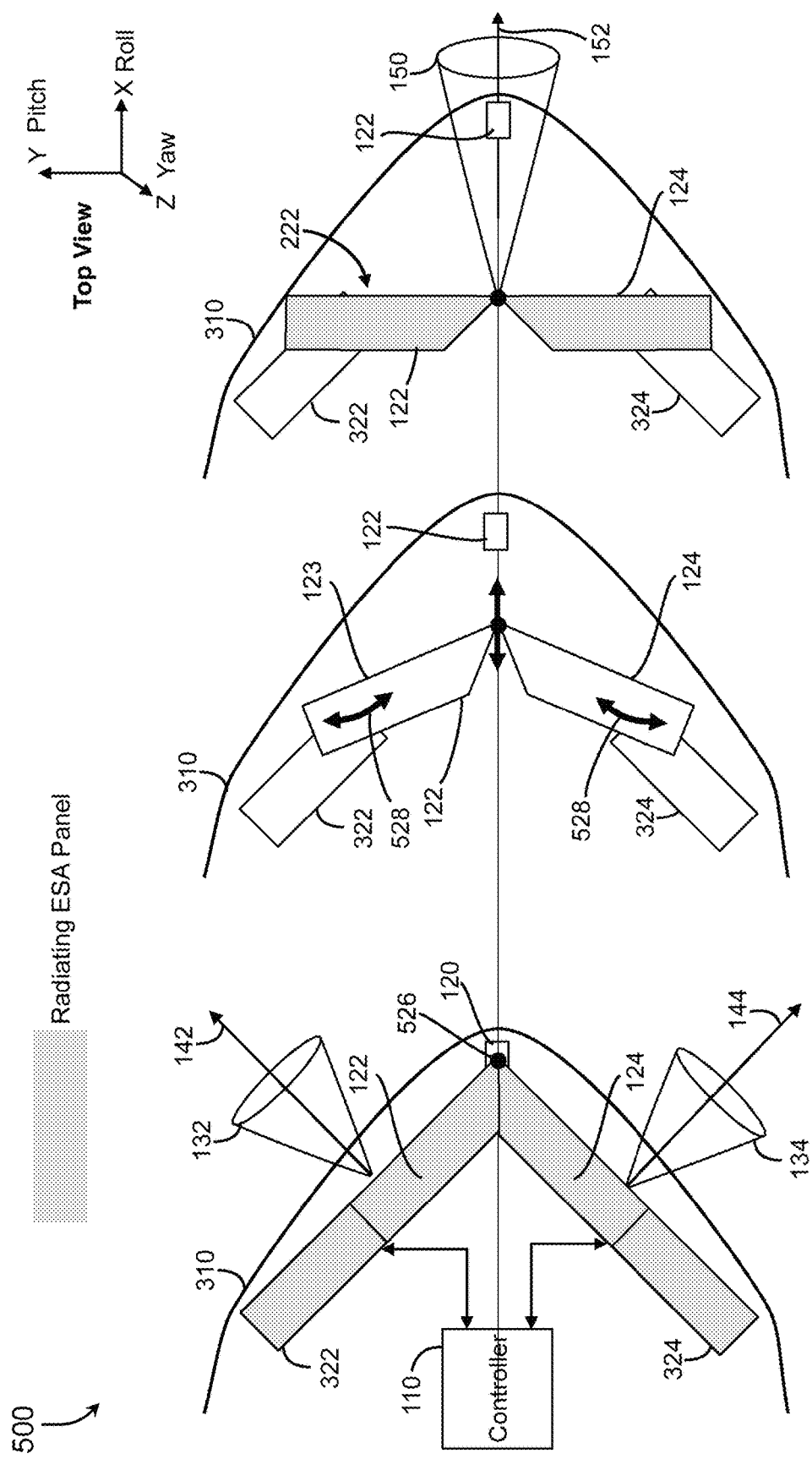

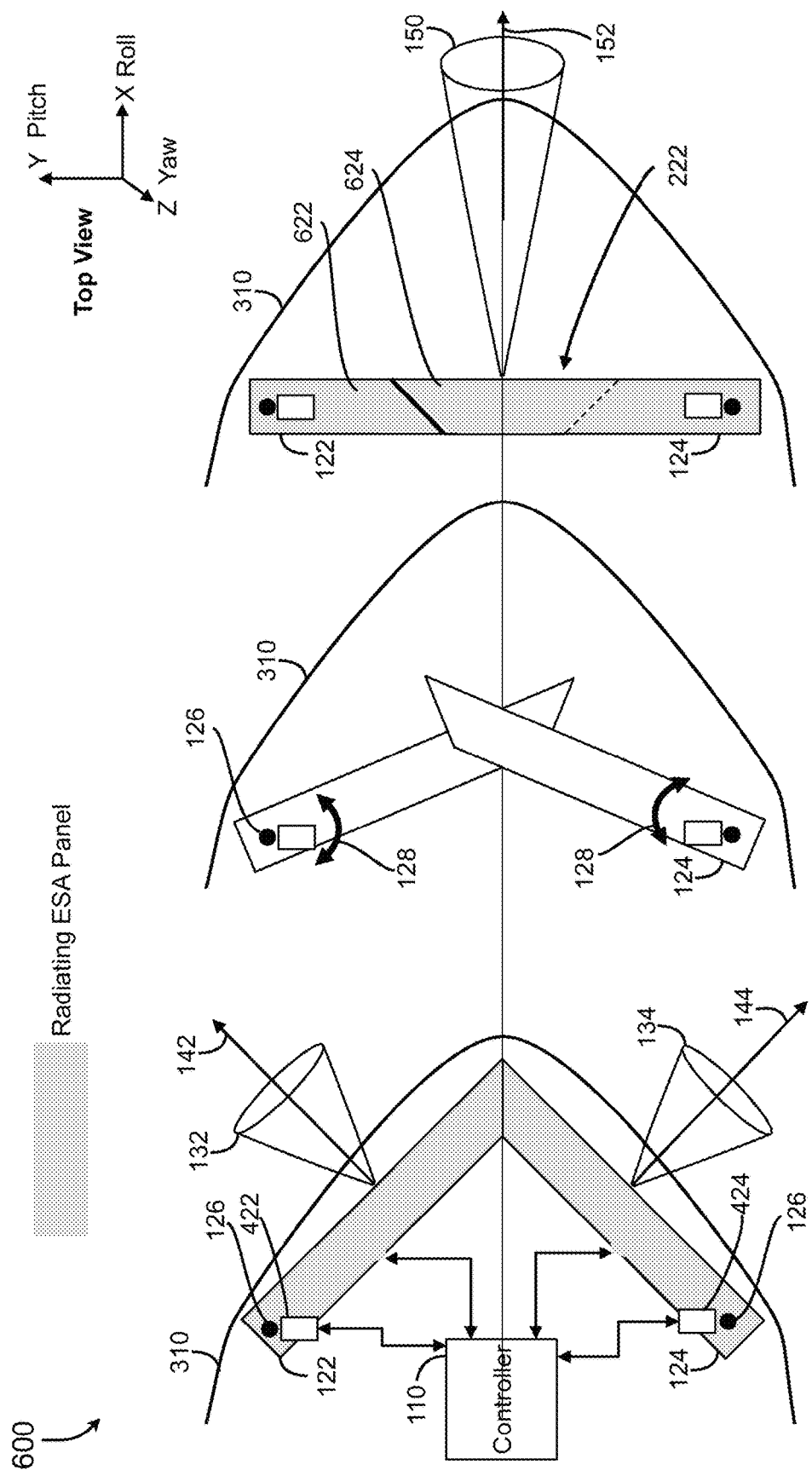

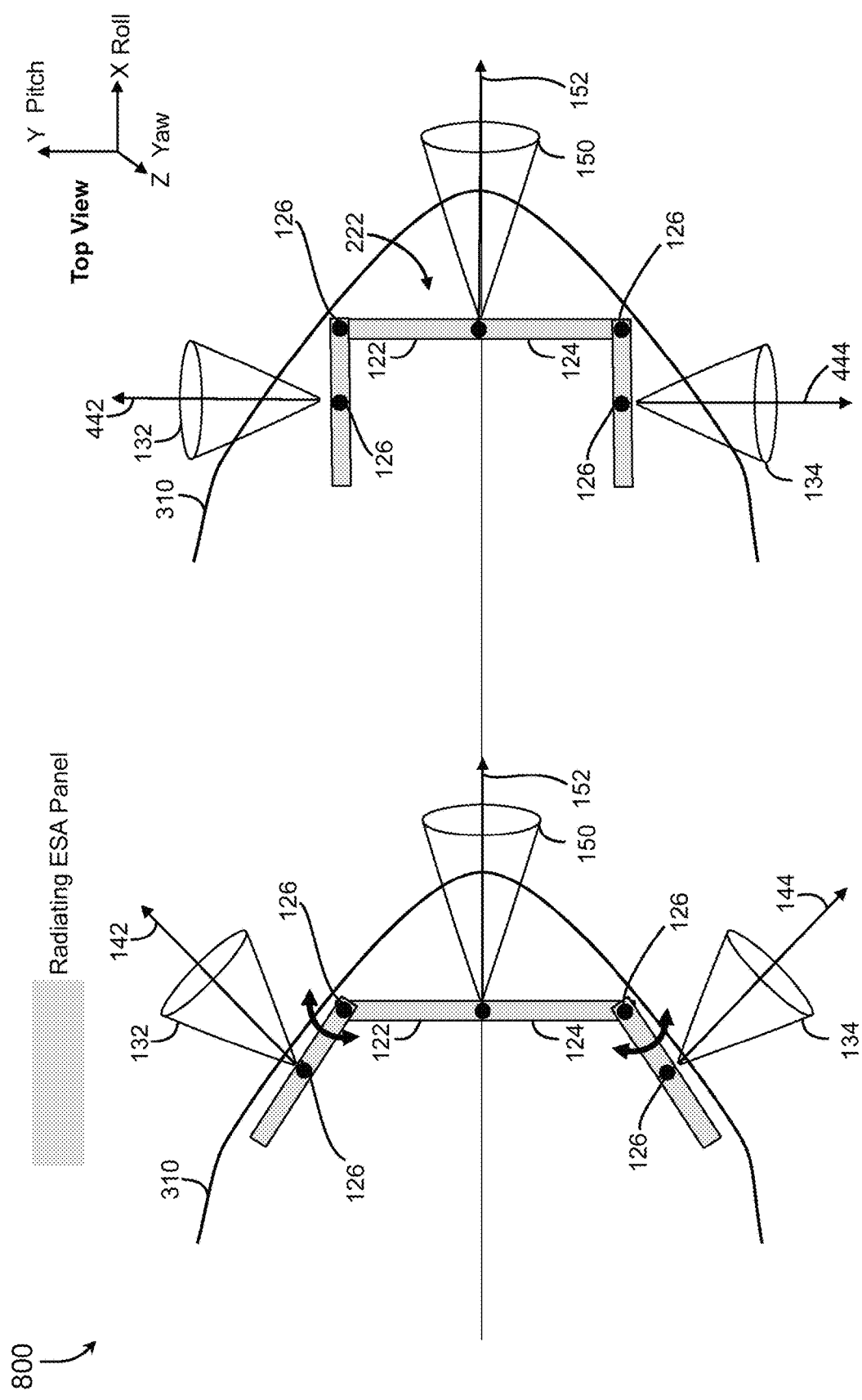

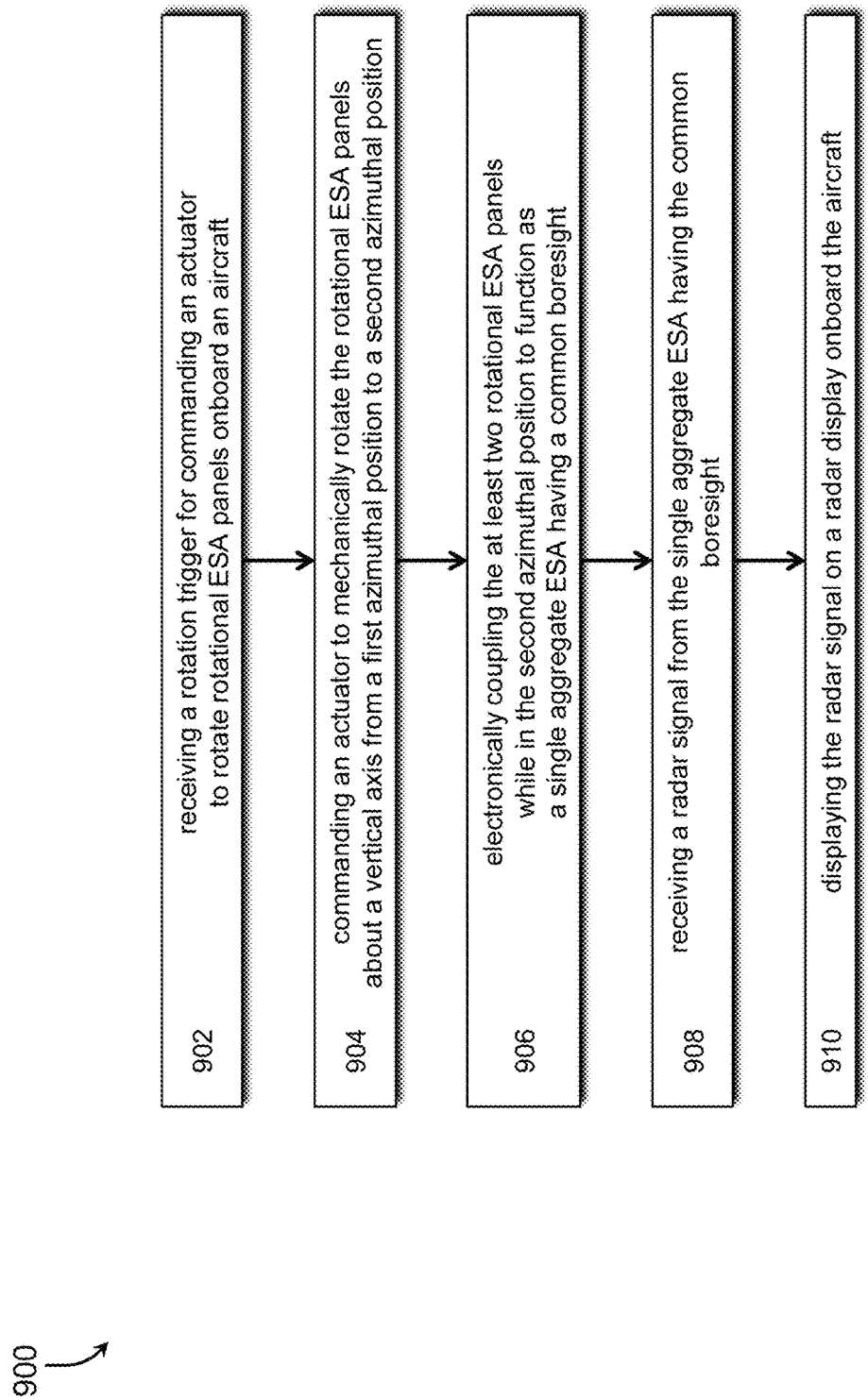

ESA QUADRANT MECHANICAL RECONFIGURATION

BACKGROUND

Beamforming may be complex on angled, multi panel electronically scanned array (ESA) surfaces requiring signal delays as well as return signal integration across varying sets of quadrants. These multi panel ESA configurations may be considerably expensive compared to the supporting hardware and mechanical fixtures. In an angled multi panel design, an apparent aperture size may reduce as the directed beam moves away from boresight which results in lower gain, lower range and increased interference.

Traditional multi-axis rotation system may require heavy and power consuming alignment hardware. These complex mechanical scanning systems may continuously drive the ESA in azimuth or elevation and require algorithmically complex and power consuming computers to process the received radar signals.

Therefore, a need remains for a system and related method which may overcome these limitations and provide a novel solution to simply mechanically rotating a portion or an entirety of two or more ESA panels and electrically combining the rotated ESA panels to form a single aggregate ESA.

SUMMARY

In one embodiment of the inventive concepts disclosed herein, a system for mechanically positioning an electronically scanned array (ESA) panel may comprise two or more rotational ESA panels onboard an aircraft, the two rotational ESA panels configured for a rotation, the rotation about a vertical axis. For rotation, each of the two rotational ESA panels may be individually operational in a first azimuthal position having a first boresight and collectively operational in a second azimuthal position having a common boresight, the second azimuthal position of each of the two rotational ESA panels being equal, the first azimuthal position distant from the second azimuthal position by the rotation.

To manipulate the rotational ESA panels, an actuator may be coupled with each of the two rotational ESA panels, the actuator configured to mechanically cause the rotation. The system may also include a radar display available to one of a pilot and an autopilot of the aircraft.

For overall control, the system may include a controller operatively coupled with each of the two rotational ESA panels and the actuator and a tangible, non-transitory memory configured to communicate with the controller, the tangible, non-transitory memory having instructions stored therein that, in response to execution by the controller, cause the controller to carry out each function of the system.

The controller may receive a rotation trigger for commanding the actuator to rotate the two rotational ESA panels and command the actuator to rotate the two rotational ESA panels from the first azimuthal position to the second azimuthal position without stopping in an intermediate azimuthal position. The controller may further electronically couple the two rotational ESA panels while in the second azimuthal position to coherently operate as a single aggregate ESA having the common boresight and receive a radar signal from the single aggregate ESA having the common boresight.

For crew awareness, the system may display the radar signal on the radar display. Once the rotation trigger may no longer be active, the controller may receive a de-rotation trigger to rotate the two rotational ESA panels from the second azimuthal position to the first azimuthal position and command the actuator to de-rotate the two rotational ESA panels from the second azimuthal position to the first azimuthal position.

An additional embodiment of the inventive concepts disclosed herein is directed to a method for mechanically positioning an electronically scanned array (ESA) panel. The method may comprise receiving a rotation trigger for commanding an actuator to rotate two rotational ESA panels onboard an aircraft and commanding an actuator to mechanically rotate the two rotational ESA panels about a vertical axis from a first azimuthal position to a second azimuthal position.

The method may include electronically coupling the two rotational ESA panels while in the second azimuthal position to coherently operate as a single aggregate ESA having a common boresight and receiving a radar signal from the single aggregate ESA having the common boresight. The method may further include displaying the radar signal on a radar display onboard the aircraft.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which:

FIGS. 2A-C are diagrams of a top view full panel center rotation in accordance with an embodiment of the inventive concepts disclosed herein;

FIGS. 4A-F are diagrams of a partial panel lateral rotation exemplary of one embodiment of the inventive concepts disclosed herein;

FIGS. 5A-C are diagrams of a partial panel center translation rotation in accordance with one embodiment of the inventive concepts disclosed herein;

FIGS. 6A-C are diagrams of an exemplary full panel lateral rotation in accordance with one embodiment of the inventive concepts disclosed herein;

FIGS. 8A-D are diagrams of a multi-panel rotation diagram exemplary of one embodiment of the inventive concepts disclosed herein; and FIG. 9 is a diagram of a method flow exemplary of one embodiment of the inventive concepts disclosed herein.

DETAILED DESCRIPTION OF EXEMPLARY EMBODIMENTS

Figure 1:
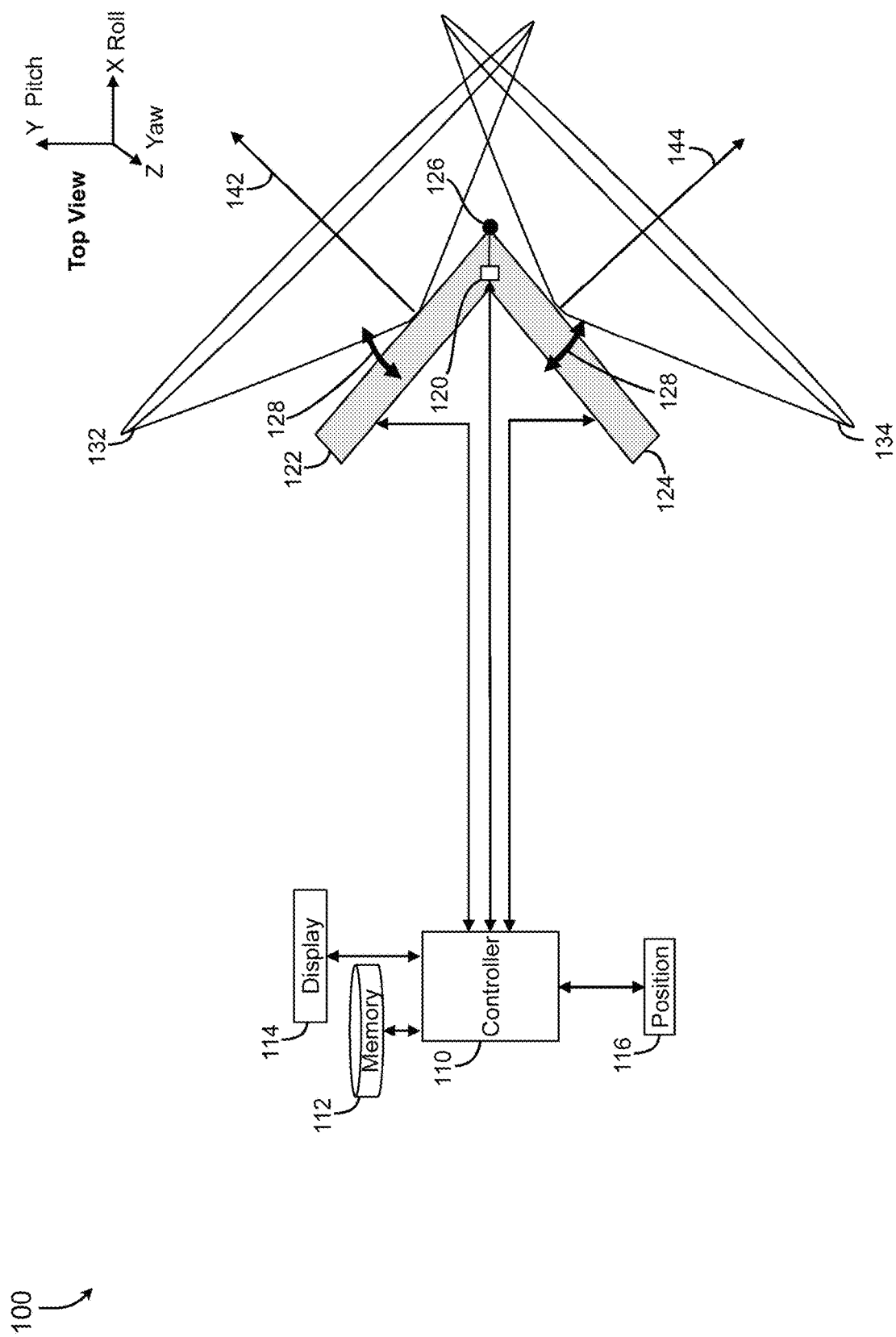
FIG. 1 is a diagram of a system for mechanically positioning an electronically scanned array (ESA) panel in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

As used herein the term "approximately" in claim language as well as specification language may refer to a range of values plus or minus twenty percent (+/−20%) of the claimed value. For example, "approximately 100" may refer to, and therefore claim, the range of 80 to 120.

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Overview

Broadly, embodiments of the inventive concepts disclosed herein are directed to a system and method for ESA quadrant mechanical reconfiguration. The system functions to shift some of the complexity from algorithmic manipulation of received radar data to mechanical transformation of a simple panel structure to achieve desired performance in a desired ESA boresight. The system receives a rotation trigger based on an external event such as altitude and mission and causes two or more simple ESA panels to rotate from a first azimuthal position to a second common azimuthal position without stopping at an intermediate azimuth. Once positioned, each individual rotational ESA panel is combined to function as a single aggregate ESA enabling desired performance in field of view, resolution and range at a common boresight.

| REFERENCE CHART | |
|---|---|
| 100 | System Diagram |
| 110 | Controller |
| 112 | Memory |
| 114 | Radar Display |
| 116 | Position |
| 120 | Actuator |
| 122 | Left Rotational ESA |
| 124 | Right Rotational ESA |
| 126 | Vertical Rotation Axis |
| 128 | Vertical Rotation Direction |
| 132 | Left ESA Scan Volume |
| 134 | Right ESA Scan Volume |
| 142 | Left ESA Boresight |
| 144 | Right ESA Boresight |
| 150 | Combined ESA Scan Volume |
| 152 | Common ESA Boresight |
| 200 | Top View Full Panel Center Rotation |
| 222 | Single Aggregate ESA |
| 300 | Partial Panel Center Rotation |
| 310 | Aircraft Radome |
| 322 | Stationary Left ESA |
| 324 | Stationary Right ESA |
| 400 | Partial Panel Lateral Rotation |
| 422 | Left Actuator |
| 424 | Right Actuator |
| 432 | Left Outer Rotational ESA Panel |
| 434 | Right Outer Rotational ESA Panel |
| 442 | Left ESA Second Boresight |
| 444 | Right ESA Second Boresight |
| 500 | Partial Panel Center Translation Rotation |
| 526 | Translating Axis of Rotation |
| 528 | Translation Rotation Direction |
| 600 | Full Panel Lateral Rotation |
| 622 | Partial Left Radiating ESA |
| 624 | Full Right Radiating ESA |
| 700 | Right Side View |
| 726 | Horizontal Rotation Axis |
| 728 | Horizontal Rotation Direction |
| 800 | Multi-Panel Rotation Diagram |
| 900 | Method |

FIG. 1

Referring to FIG. 1, a diagram of a system 100 for mechanically positioning an electronically scanned array panel in accordance with an embodiment of the inventive concepts disclosed herein is shown. Generally, a system for mechanically positioning an electronically scanned array panel may include angularly, mechanically manipulating rotational ESA panels from a first azimuthal position to a second, common azimuthal position. Once rotated, the system may function to electronically couple the two rotational ESA panels while in the second azimuthal position to coherently operate as a single aggregate ESA having a common boresight.

System Description

In one embodiment of the inventive concepts disclosed herein, the system for mechanically positioning an electronically scanned array panel 100 may include at least two rotational ESA panels which may include a left rotational ESA 122 and a right rotational ESA 124. In some configurations, the two rotational ESA panels may be in a chevron configuration as shown in FIG. 1. Additional configurations of the rotational ESA panels may fall directly within the scope of the inventive concepts disclosed herein.

The rotational ESA 122 124 may be installed onboard an aircraft and configured for a rotation which may be about a vertical axis as well as a horizontal axis. In some embodiments, the rotational ESA panels may rotate about the vertical axis which is also aligned perpendicularly with a longitudinal axis of the aircraft.

As used herein, the vertical (Z) axis may be associated with a lift vector of the aircraft about which the aircraft may yaw. A Longitudinal (X) axis may be the axis about which the aircraft may roll (e.g., centerline). The horizontal (Y) axis may be the axis about which the aircraft may pitch.

In some embodiments, the left rotational ESA 122 may rotate about a vertical rotation axis 126 in a vertical rotation direction 128. While in the first azimuthal position (here, shown at 45 degrees left of the longitudinal axis), the left rotational ESA 122 may maintain a left ESA scan volume 132 as well as a left ESA boresight 142. Similarly, the right rotational ESA 124 may maintain a right ESA scan volume 134 and a right ESA boresight 144 when positioned to the first azimuthal position. In some embodiments, each of the at least two rotational ESA panels may be individually operational in the first azimuthal position having a first boresight and collectively operational in a second azimuthal position having a common boresight, the second azimuthal position of each of the at least two rotational ESA panels being equal, the first azimuthal position distant from the second azimuthal position by the rotation. In some embodiments, the first boresight 142 of the left rotational ESA panel 122 may be distant from the first boresight 144 of the right rotational ESA panel 134 by at least 45 degrees. In another embodiment, the rotation from the first azimuthal position to the second azimuthal position may be approximately 45-60 degrees.

As used herein, an azimuthal position may include a boresight of the rotational ESA panel 122 in azimuth. The azimuthal position may be physically limited by aircraft internal configuration (e.g. nose radome area, aircraft structure blocking radar energy). Generally, each azimuthal position herein may be discussed surrounding a forward-looking radar system (e.g. +/−120 degrees of the nose). However, additional azimuthal positions (e.g., aft, side) and elevational positions (e.g. down, up) may fall directly within the scope of the inventive concepts disclosed herein.

In one embodiment of the inventive concepts disclosed herein, the system for mechanically positioning an electronically scanned array panel 100 may include an actuator 120 coupled with each of the at least two rotational ESA panels, the actuator configured to mechanically cause the rotation. The actuator 120 may be a single actuator 120 functional to rotate both of the at least two rotational ESA panels as well as multiple actuators 120 configured to individually rotate an individual ESA panel or multiple rotational ESA panels.

In one embodiment, the system for mechanically positioning an electronically scanned array panel 100 may further include a radar display 114 available to a pilot and/or an autopilot of the aircraft. The radar display 114 used herein may be defined as an information device configured for presenting radar information in a format recognizable by the intended recipient. Here, a pilot may be the intended recipient wherein a visual display may be appropriate. In some embodiments, the display may be an interface configured for information exchange in a format recognizable by a mission computer or autopilot processor for autonomous operation. In some embodiments, the system for mechanically positioning an electronically scanned array panel 100 may include a positioning system 116 configured for supplying a position as well as an altitude of the aircraft.

Also, as used herein, the term aircraft may apply to any aerial vehicle to which an ESA panel may be operationally coupled. Exemplary aerial vehicles may include a manned aircraft, an unmanned aircraft system (UAS), as well as a rotorcraft and multi (e.g., quad) rotor copter.

In one embodiment of the inventive concepts disclosed herein, the system for mechanically positioning an electronically scanned array panel 100 may include a controller 110 operatively coupled with each of the at least two rotational ESA panels and the actuator. The controller 110 may function to control the radar operation of each ESA panel as well as the rotation of each ESA panel.

In embodiments, the system for mechanically positioning an electronically scanned array panel 100 may further include a tangible, non-transitory memory 112 configured to communicate with the controller 110, the tangible, non-transitory memory 112 may have instructions stored therein that, in response to execution by the controller, cause the controller to carry out each function of the systems herein.

FIG. 2

Referring now to FIGS. 2A-C, diagrams of a top view full panel center rotation in accordance with an embodiment of the inventive concepts disclosed herein are shown. A full panel center rotation diagram 200 may indicate a rotation of each of the left rotational ESA panel 122 and the right rotational ESA panel 124 about a vertical rotation axis 126 aligned with the longitudinal axis of the aircraft.

System Function

In one embodiment of the inventive concepts disclosed herein, the controller 110 may receive a rotation trigger for commanding the actuator 120 to rotate the at least two rotational ESA panels 122 124 and command the actuator 120 to rotate the at least two rotational ESA panels 122 124 from the first azimuthal position to the second azimuthal position without stopping in an intermediate azimuthal position. In one embodiment, the first azimuthal position and the second azimuthal position are separated by approximately 45 degrees In embodiments, the rotation trigger may be related to a plurality of factors causing a change in the boresight of the left 122 and right 124 rotational ESA panels. In some embodiments, the rotation trigger may be any of an altitude trigger, a mission trigger, a threat trigger including a radar warning receiver (RWR) indication, a ground proximity warning, a traffic trigger, a manual trigger via pilot interaction with the radar display, and an environmental trigger such as weather, windshear, turbulence, etc. For example, an altitude trigger may be associated with a specific altitude (e.g., below 3000 ft AGL) of the aircraft received by the positioning system 116. At low altitude, one employment operation may include a forward-looking radar where each rotational ESA panel 122 124 may be positioned to the second azimuthal position. The altitude related trigger may offer the ability to automatically position the rotational ESA panels to the desired common boresight 152.

In one embodiment, the mission trigger may include a specific desired common boresight 152 for accomplishing a specific mission. For example, one mission may be a ground mapping radar mission where a forward common boresight 152 may be desirable. A terrain following mission may also provide a mission trigger to cause the controller 110 to command a specific common boresight 152. Additionally, the controller 110 may receive a windshear or traffic alert and cause the controller 110 to take action. In one embodiment, the controller may automatically rotate and de-rotate the rotational ESA panels 122 124 based on the altitude.

In one embodiment, the common boresight may be aligned with the longitudinal axis of the aircraft to enable a forward-looking radar system for a plurality of mission related purposes (e.g., ground proximity, traffic awareness, weather awareness).

In one embodiment, the controller 110 may depower each of the rotational ESA panels 122 124 during the rotation. This depower action may function to create a two-position operation of either operation in the first azimuthal position or operation in the second azimuthal position without scanning an azimuth between the two. For example, the left rotational ESA panel 122 may function in the first azimuthal position with a boresight centered 45 degrees left of the aircraft nose (longitudinal axis). During rotation to the second azimuthal position the left rotational ESA panel 122 may be depowered during the rotation and unable to scan any azimuth during rotation. Once in the second azimuthal position, the controller 110 may repower the left rotational ESA panel 122 to scan the common boresight 152 aligned with the longitudinal axis.

Once the rotational ESA panels 122 124 are in the second azimuthal position, the controller 110 may electronically couple the at least two rotational ESA panels while in the second azimuthal position to coherently operate as a single aggregate ESA 222 having the common boresight 152 and a combined ESA scan volume 150. This may effectively create a larger synthetic planar array whose horizontal size is a plan back projection of the conformal structure. While the rotational ESA panels 122 124 are in the second azimuthal position, the controller 110 may apply similar controlling logic to the single aggregate ESA 222 as applied to each individual rotational ESA prior to the rotation. In this manner, a simple configuration of two rotational ESA panels 122 124 may increase function of the system for mechanically positioning an electronically scanned array panel 100 by shifting system complexity from a powerful computing device to a simple mechanical actuator 120.

In one embodiment, the controller 110 may receive a radar signal from the single aggregate ESA panel 222 having the common boresight 152 and display the radar signal on the radar display. Once the rotation trigger may be no longer valid, the controller 110 may receive a de-rotation trigger to rotate the at least two rotational ESA panels 122 124 from the second azimuthal position back to the first azimuthal position and command the actuator 120 to rotate the at least two rotational ESA panels 122 124 from the second azimuthal position to the first azimuthal position without stopping in the intermediate azimuthal position.

Of note, the indicated scan volume 150 may be exemplary only wherein a typical scan volume of an ESA panel may reach 90 degrees either side of the boresight. Here for clarity of diagrams, a scan volume 150 may be displayed in the figures for illustrative purposes only.

In one embodiment of the inventive concepts disclosed herein, the controller 110 may be configured to command the actuator to perform a calibration of the at least two rotational ESA panels 122 124 to each of the first azimuthal position and the second azimuthal position. Here, as the controller 110 may precisely rotate each of the rotational ESA panels 122 124, a calibration function embedded within the controller 110 may offer a system calibration for ensuring the first azimuthal position and the second azimuthal position are precisely planar.

FIG. 3 Partial Panel Rotation

Figures 3A, 3B, 3C:
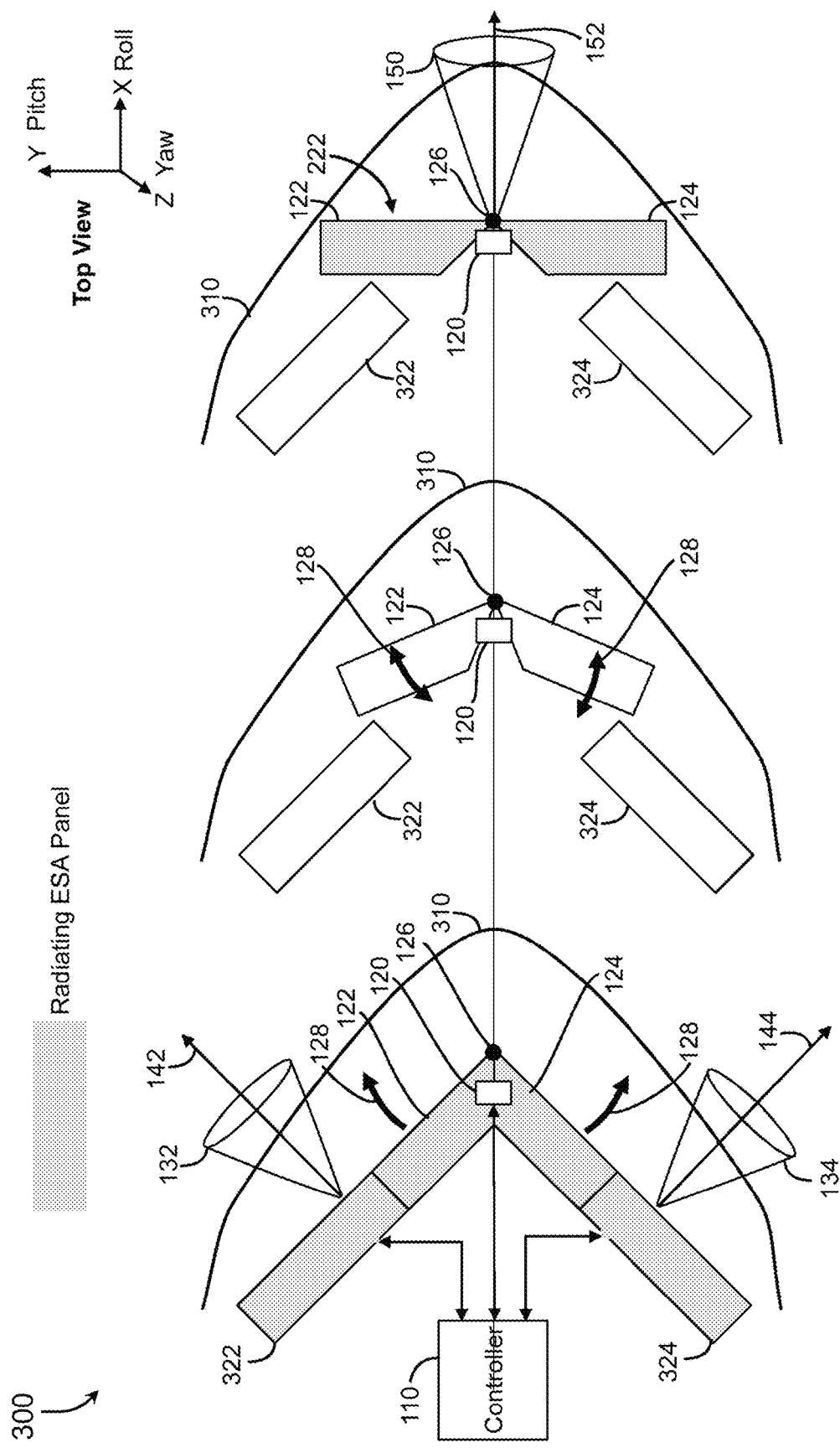
FIGS. 3A-C are diagrams of a partial panel center rotation exemplary of an embodiment of the inventive concepts disclosed herein.

Referring now to FIGS. 3A-C, diagrams of a partial panel center rotation 300 exemplary of an embodiment of the inventive concepts disclosed herein are shown. In some embodiments, the system for mechanically positioning an electronically scanned array panel 100 may be constrained by an internal shape of an aircraft radome 310. In this situation, the system for mechanically positioning an electronically scanned array panel 100 may not be able to rotate each full panel rotational ESA as in FIG. 2. In the first azimuthal position shown in FIG. 3A, each of the four ESA panels is functional and radiating with the two ESA panels on the left having the left boresight 142 and the two ESA panels on the right having the right boresight 144. Once the controller 110 begins the rotation, FIG. 3B may indicate a stationary left ESA 322 and a stationary right ESA 324 remaining in position while the rotational ESA panels 122 124 begin to rotation to the second azimuthal position.

FIG. 3C may indicate each of the rotational ESA panels 122 124 complete in the rotation to the second azimuthal position and radiating as the single aggregate ESA 222 having the common boresight 152 and the scan volume 150.

FIG. 4 Lateral Axes

Referring now to FIGS. 4A-F, diagrams of a partial panel lateral rotation 400 exemplary of one embodiment of the inventive concepts disclosed herein are shown. In one embodiment of the inventive concepts disclosed herein, the system for mechanically positioning an electronically scanned array panel 100 may function within a radome 310 of smaller size yet still enabling full rotation of the partial rotational ESA panels 122 124 from the first to the second azimuthal position.

Here, a left actuator 422 and a right actuator 424 may function to rotate the left 122 and right 124 rotational ESA panels about the vertical axes 126 (left and right) laterally displaced from the longitudinal axis of the aircraft. In this manner, internal space required for rotation may be less than a centerline vertical axis of rotation as in FIGS. 2 and 3.

In one embodiment of the inventive concepts disclosed herein, the single aggregate ESA 222 may include an overlap of the individual rotational ESA panels 122 124 once the rotation is complete. The controller 110 may electrically determine a partial radiation pattern of one of the panels to enable accurate ESA operation. For example, the left rotational ESA panel 122 may partially function with the partial radiation pattern while the right rotational ESA panel 124 may fully radiate.

FIGS. 4D through 4F may indicate an additional embodiment where each of the four ESA panels may rotate about a vertical axis 126 displaced from the longitudinal axis. Here, a left outer rotational ESA panel 432 and a right outer rotational ESA panel 434 coupled respectively with the rotational ESA panels 122 124 may further rotate the ESA panels to the second azimuthal position.

In one embodiment, the rotational ESA panels may be directed or "aimed" to align their individual boresights at a point in space. Here, a boresight focus may intersect at a single point in the distance or the boresights may be aimed at particular points of an object in the distance.

In this embodiment, the left and right outer rotational ESA panels may combine to form the single aggregate ESA 222 when rotated to the second azimuthal position. Although laterally displaced from the longitudinal axis, the left 432 and right 434 outer rotational ESA panels may electrically function as the single aggregate ESA panel 222 with an appropriate time delay/phase shift applied between the arrays.

FIG. 5 Translation Rotation

Referring now to FIGS. 5A-C, diagrams of a partial panel center translation rotation 500 in accordance with one embodiment of the inventive concepts disclosed herein are shown. In one embodiment of the inventive concepts disclosed herein, the system for mechanically positioning an electronically scanned array panel 100 may further reduce a size necessary to perform the rotation by translating as well as rotating the rotational ESA panels 122 124. Here, the actuator 120 may be positioned on the longitudinal axis of the aircraft and translate a translating axis of rotation 526 along the longitudinal axis. While the translating axis of rotation moves aft in this scenario, the rotational ESA panels 122 124 may also translate outboard along a translation rotation direction 528 to the second azimuthal position.

In one embodiment, the system for mechanically positioning an electronically scanned array panel 100 may employ a variety of mechanical subsystems to cause the rotational ESA panels 122 124 to translate as well as rotate. For example, an actuator 120 including a precision jackscrew may cause the translating axis of rotation 526 to translate along the longitudinal axis.

FIG. 6 Displaced

Referring now to FIGS. 6A-C, diagrams of an exemplary full panel lateral rotation in accordance with one embodiment of the inventive concepts disclosed herein are shown. In one embodiment, the vertical axis of rotation 126 may be aligned with the longitudinal axis of the aircraft (e.g., FIG. 2A), proximally offset from the longitudinal axis of the aircraft (e.g., FIG. 4A), and distally offset from the longitudinal axis (e.g., FIG. 6A).

Here, the vertical axis of rotation 126 may be laterally displaced at an outboard edge of the rotational ESA panels 122 124. The full panel lateral rotation 600 may maintain a significant inside overlap once the rotational ESA panels 122 124 are rotated to the second azimuthal position. In this embodiment, the single aggregate ESA panel 222 may comprise a partial left radiating ESA 622 and a full right radiating ESA 624.

FIG. 7 Elevational Rotation

Figures 7A, 7B, 7C:
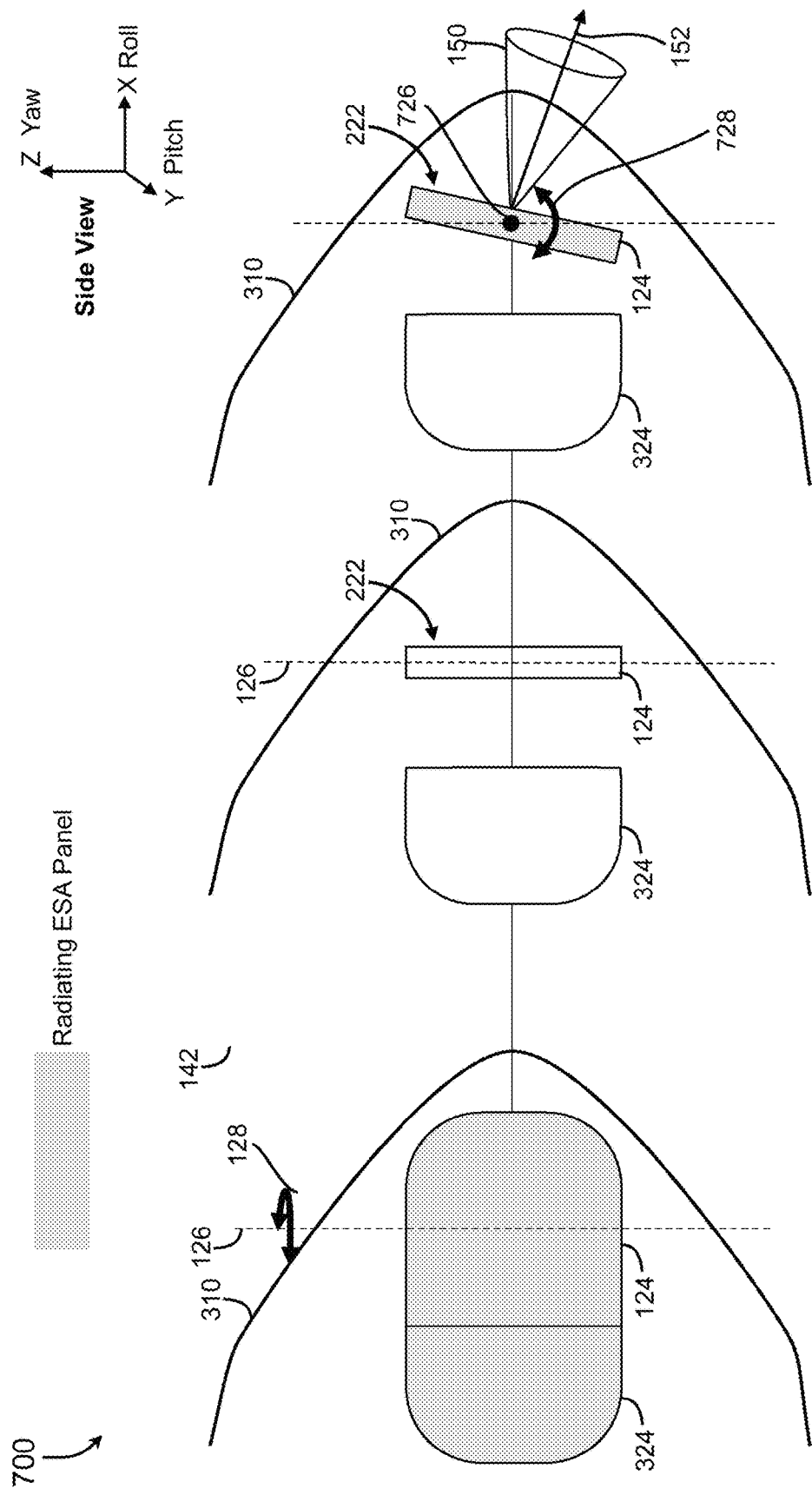
FIGS. 7A-C are diagrams of a right side view associated with one embodiment of the inventive concepts disclosed herein.

Referring now to FIG. 7A-C, diagrams of a right-side view 700 associated with one embodiment of the inventive concepts disclosed herein are shown. The right-side view 700 may indicate an additional embodiment wherein the system for mechanically positioning an electronically scanned array panel 100 may further rotate the rotational ESA panels 122 124 in elevation about a horizontal axis of rotation 726 in a horizontal rotation direction 728. Here, FIG. 7A may indicate the right panel 124 prior to the rotation about the vertical axis. FIG. 7B may indicate the single aggregate ESA 222 after the rotation about the vertical axis is complete, and FIG. 7C may detail the elevational rotation about the horizontal rotation axis 726.

Once the controller 110 commands the single aggregate ESA 222 to the second azimuthal position the controller 110 may further rotate the single aggregate ESA 222 about the horizontal rotation axis 726. Once complete, the single aggregate ESA 222 may function with a common boresight 152 angularly displaced from the longitudinal axis. As above, during rotation in both azimuth and elevation, the controller 110 may depower each rotational ESA panel 122 124 and repower each once in the desired position.

In some embodiments, the system 100 may identify or "tune" the distance between a wall of the radome 310 and the ESA panel to attempt to compensate for radome imperfections and compensation. In this manner, the controller 110 may determine each signature of the radome 310 to which it is installed and compensate for various abnormalities within the radome 310 structure. For example, each radome 310 may include a frame structure, a lighting mitigation structure, and possible fasteners of variable composition (e.g., metallic, ferrous, reflective) through which radar energy may deviate from a perfect boresight. The controller 110 may compensate for these imperfections in processing the reflected radar energy within a specific azimuth of these imperfections.

FIG. 8 Multi Panel

Referring now to FIGS. 8A-D, diagrams of a multi-panel rotation diagram 800 exemplary of one embodiment of the inventive concepts disclosed herein are shown. In one embodiment of the inventive concepts disclosed herein, the system for mechanically positioning an electronically scanned array panel 100 may include a six-panel rotational ESA configuration wherein the controller 110 may command a plurality of second azimuthal positions to enable a desired common boresight 152.

FIG. 8A may indicate the six panel ESA array in a first configuration capable of a three boresight 142 152 144 operation. In an additional configuration, FIG. 8B may indicate an additional azimuthal position of each of the six ESA panels offering the controller 110 an optional beam boresight where a left ESA second boresight 442 and a right ESA second boresight 444 may provide additional function.

In some embodiments, the ESA panels may be fitted within the radome 310 in a onetime fit of a "conformal" ESA and optimized conformal aperture size within an arbitrary radome. The subpanels may be coherently combined through time deal compensation to effectively create a conformal ESA. In other embodiments, the rotational ESA panels may be equal or unequal in size as indicated in the previous figures. In each configuration, simultaneous independent beams are possible across all the subpanels.

Figure 8D:
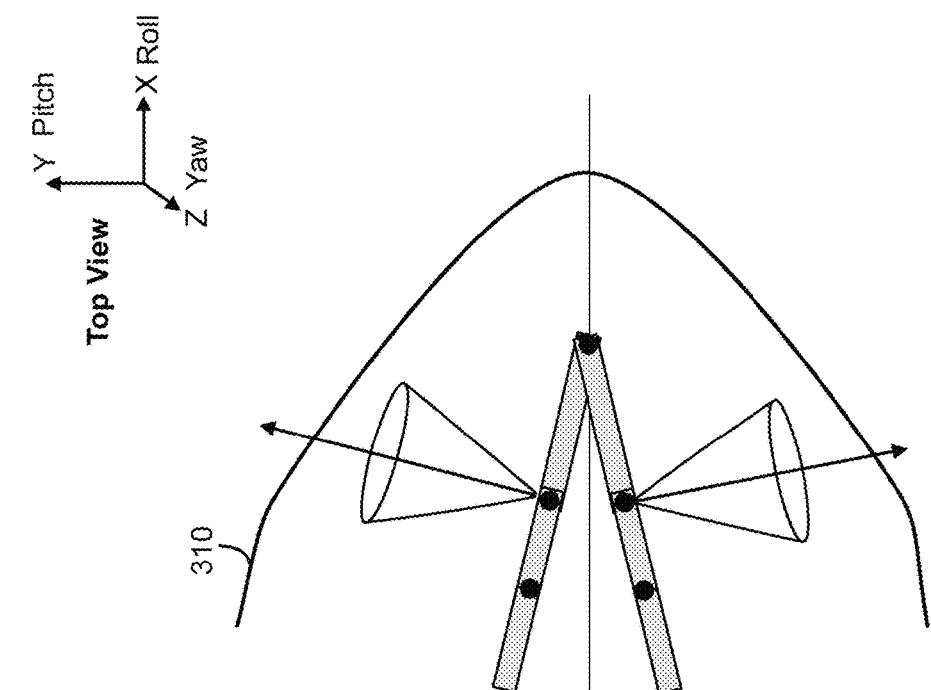
Figure 8C:
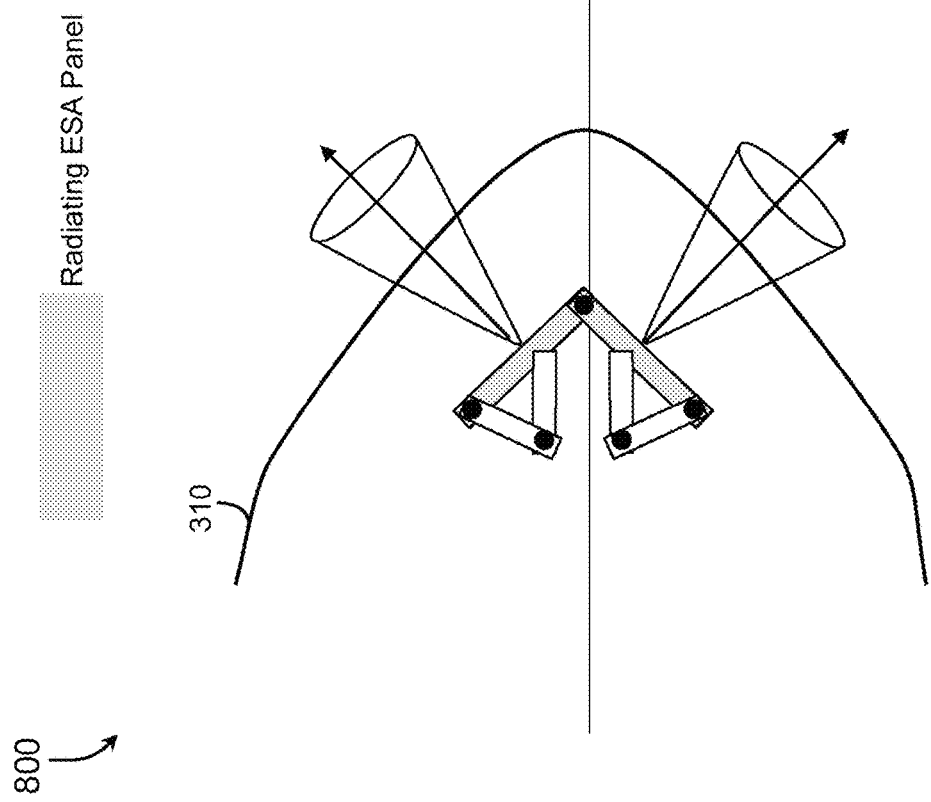

FIG. 8C may indicate a folded configuration offering a chevron configuration while FIG. 8D may indicate each ESA panel operational and radiating in an extended chevron configuration.

In some embodiments, the plurality of rotational ESA may provide a maximum reuse with a standard ESA panel assembly that can be used and reconfigured to be compatible a host of radomes as well as additional applications (e.g., ground vehicles, watercraft, etc.) The reconfiguration may be either a onetime installation or mission dependent dynamic as described above.

In some embodiments, the mechanical rotation may be asymmetric as the application may demand. Although FIGS. 8A-8D may indicate a symmetric rotation, it is contemplated herein an asymmetric rotation (e.g., a left side rotation only) may fall well within the scope of the inventive concepts disclosed herein.

In embodiments, the mechanical rotation may be not at a 100% duty cycle, unlike existing electromechanically scanned systems, so compared with a traditional continuously scanning radar, embodiments of the inventive concepts disclosed herein may consume less DC power and maintain an increase in reliability.

In some embodiments, the separate sub-panels shown in the drawings may be made time/phase coherent to operate as a composite conformal aperture if the appropriate time delays are incorporated between the subpanels. Subpanels may function having an independently steered beam, may be a coherent conformal array, as well as toggle back and forth between these modes.

FIG. 9 Method

Referring now to FIG. 9, a diagram of a method flow 900 exemplary of one embodiment of the inventive concepts disclosed herein is shown. The method flow 900 may include, at a step 902, receiving a rotation trigger for commanding an actuator to rotate at least two rotational ESA panels onboard an aircraft, and, at a step 904, commanding an actuator to mechanically rotate the at least two rotational ESA panels about a vertical axis from a first azimuthal position to a second azimuthal position.

The method may include, at a step 906, electronically coupling the at least two rotational ESA panels while in the second azimuthal position to function as a single aggregate ESA having a common boresight. The method may further include, at a step 908, receiving a radar signal from the single aggregate ESA having the common boresight and, at a step 910, displaying the radar signal on a radar display onboard the aircraft

Conclusion

As will be appreciated from the above description, embodiments of the inventive concepts disclosed herein may provide a novel solution to simply mechanically rotating a portion or an entirety of two or more ESA panels and electrically combining the rotated ESA panels to form a single aggregate ESA.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for mechanically positioning an electronically scanned array (ESA) panel, comprising: at least two rotational ESA panels onboard an aircraft, the at least two rotational ESA panels configured for a rotation, the rotation at least about a vertical axis, the aircraft having a longitudinal axis; each of the at least two rotational ESA panels individually operational in a first azimuthal position having a first boresight and collectively operational in a second azimuthal position having a common boresight, the second azimuthal position of each of the at least two rotational ESA panels being equal, the first azimuthal position distant from the second azimuthal position by the rotation; an actuator coupled with each of the at least two rotational ESA panels, the actuator configured to mechanically cause the rotation; a radar display available to one of a pilot and an autopilot of the aircraft; a controller operatively coupled with each of the at least two rotational ESA panels and the actuator; a tangible, non-transitory memory configured to communicate with the controller, the tangible, non-transitory memory having instructions stored therein that, in response to execution by the controller, cause the controller to: receive a rotation trigger for commanding the actuator to rotate the at least two rotational ESA panels, the rotation trigger one of: an altitude trigger, a mission trigger, and a threat trigger; command the actuator to rotate the at least two rotational ESA panels from the first azimuthal position to the second azimuthal position without stopping in an intermediate azimuthal position; electronically couple the at least two rotational ESA panels while in the second azimuthal position to coherently operate as a single aggregate ESA having the common boresight; receive a radar signal from the single aggregate ESA having the common boresight; display the radar signal on the radar display; receive a de-rotation trigger to rotate the at least two rotational ESA panels from the second azimuthal position to the first azimuthal position; and command the actuator to de-rotate the at least two rotational ESA panels from the second azimuthal position to the first azimuthal position.

2. The system for mechanically positioning an ESA panel of claim 1, wherein the at least two rotational ESA panels further comprises a left rotational ESA panel and a right rotational ESA panel, a first boresight of the left rotational ESA panel distant from a first boresight of the right rotational ESA panel by at least approximately 90 degrees.

3. The system for mechanically positioning an ESA panel of claim 1, further comprising a positioning system configured at least for determining an altitude of the aircraft, and wherein the controller automatically rotates and de-rotates based on the altitude.

4. The system for mechanically positioning an ESA panel of claim 1, wherein the vertical axis is one of: aligned with the longitudinal axis of the aircraft, proximally offset from the longitudinal axis of the aircraft, and distally offset from the longitudinal axis.

5. The system for mechanically positioning an ESA panel of claim 1, wherein the at least two rotational ESA panels are further configured for one of: a full panel rotation and a partial panel rotation.

6. The system for mechanically positioning an ESA panel of claim 5, wherein the partial panel rotation rotates about the vertical axis, the vertical axis being one of: aligned with the longitudinal axis of the aircraft, proximally offset from the longitudinal axis of the aircraft, and distally offset from the longitudinal axis.

7. The system for mechanically positioning an ESA panel of claim 1, wherein command the actuator to rotate further comprises a calibration of the at least two rotational ESA panels to each of the first azimuthal position and the second azimuthal position.

8. The system for mechanically positioning an ESA panel of claim 1, wherein display the radar signal on the radar display further comprises an information exchange in a format recognizable by the autopilot.

9. The system for mechanically positioning an ESA panel of claim 1, wherein the common boresight is aligned with the longitudinal axis of the aircraft.

10. The system for mechanically positioning an ESA panel of claim 1, wherein the rotation further comprises a horizontal rotation of the single aggregate ESA having the common boresight about a horizontal axis.

11. The system for mechanically positioning an ESA panel of claim 1, wherein the at least two rotational ESA panels are depowered during the rotation.

\* \* \* \* \*